United States Patent
Rust et al.

(10) Patent No.: US 6,507,945 B1
(45) Date of Patent: Jan. 14, 2003

(54) SYNTHESIZING COMBINATORIAL LIBRARIES OF MATERIALS

(75) Inventors: William C. Rust, Sunnyvale, CA (US); Ralph B. Nielsen, San Jose, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/305,830

(22) Filed: May 5, 1999

(51) Int. Cl.[7] ................................. G06F 9/44
(52) U.S. Cl. ..................... 717/103; 717/116; 717/108; 717/163; 717/164; 717/165; 717/100; 700/1; 700/230; 707/10
(58) Field of Search .............................. 700/245, 248, 700/268, 266; 345/594; 717/100, 101, 104, 103, 108, 163, 164, 116, 1, 230; 707/10

(56) References Cited

U.S. PATENT DOCUMENTS

| | | | | |
|---|---|---|---|---|
| 4,829,445 A | * | 5/1989 | Burney ........................ | 700/230 |
| 4,901,221 A | | 2/1990 | Kodosky et al. ............. | 364/200 |
| 5,291,587 A | | 3/1994 | Kodosky et al. ............. | 395/500 |
| 5,437,838 A | | 8/1995 | DeMoranville et al. ....... | 422/67 |
| 5,443,791 A | | 8/1995 | Cathcart et al. .............. | 422/65 |
| 5,499,193 A | | 3/1996 | Sugawara et al. ........... | 364/500 |
| 5,506,787 A | | 4/1996 | Muhlfeld et al. ....... | 364/474.23 |
| 5,546,301 A | | 8/1996 | Agrawal et al. ............. | 364/140 |
| 5,576,946 A | | 11/1996 | Bender et al. .............. | 364/146 |
| 5,593,839 A | | 1/1997 | Hubbell et al. ................ | 435/6 |
| 5,611,059 A | | 3/1997 | Benton et al. ............... | 395/326 |
| 5,614,608 A | | 3/1997 | Krchnak et al. ............. | 530/334 |
| 5,623,592 A | | 4/1997 | Carlson et al. .............. | 345/866 |
| 5,719,942 A | * | 2/1998 | Aldred et al. ................. | 380/49 |
| 5,732,277 A | | 3/1998 | Kodosky et al. ............ | 395/800 |
| 5,737,498 A | | 4/1998 | Murray ........................ | 700/246 |
| 5,776,359 A | * | 7/1998 | Schultz et al. .............. | 423/263 |
| 5,781,190 A | * | 7/1998 | Gorbet et al. ............... | 345/335 |

(List continued on next page.)

FOREIGN PATENT DOCUMENTS

| | | | |
|---|---|---|---|
| EP | 0 796 654 A2 | 9/1997 | ............ B01J/19/00 |
| WO | WO 98/12559 | 3/1998 | .......... G01N/33/53 |
| WO | WO 98/14641 | 4/1998 | ............ C25D/5/02 |
| WO | WO 98/15825 | 4/1998 | .......... G01N/33/00 |
| WO | PCT/US 00/12228 | 9/2000 | |

OTHER PUBLICATIONS

Title: Managed File Distribution on the Universe Network, author: Cooper, ACM, 1984.*

(List continued on next page.)

Primary Examiner—Gregory Morse
Assistant Examiner—Chameli C. Das
(74) Attorney, Agent, or Firm—Fish & Richardson P.C.

(57) ABSTRACT

Methods and apparatus for controlling an automated material handling procedure. The method includes receiving a recipe file comprising component information and mapping information; interacting with a user to create a procedure for executing a set of material handling steps; and causing a automated material-handling apparatus to carry out the set of material-handling steps by executing the procedure. The mapping information relates a source component and a destination component. The mapping information defines one or more transfers of at least one source component material to at least one destination component location. The method includes providing to the user an assortment of pre-programmed code objects and receiving from the user a selection and arrangement of the pre-programmed code objects. The procedure is defined by the user's selection and arrangement. The procedure contains at least one first pre-programmed code object operable to read and interpret the recipe file and at least one second pre-programmed code object operable to interpret a mapping read from the recipe file.

47 Claims, 7 Drawing Sheets

Microfiche Appendix Included
(1 Microfiche, 59 Pages)

U.S. PATENT DOCUMENTS

| | | | |
|---|---|---|---|
| 5,801,942 A | 9/1998 | Nixon et al. | 700/83 |
| 5,812,394 A | 9/1998 | Lewis et al. | 364/146 |
| 5,841,959 A | 11/1998 | Guiremand | 395/140 |
| 5,856,101 A | 1/1999 | Hubbell et al. | 435/6 |
| 5,862,052 A | 1/1999 | Nixon et al. | 364/468.24 |
| 5,880,972 A | 3/1999 | Horlbeck | 364/496 |
| 5,960,200 A * | 9/1999 | Eager et al. | 717/147 |
| 5,974,164 A | 10/1999 | Chee | 382/129 |
| 6,003,040 A * | 12/1999 | Mital et al. | 707/103 R |
| 6,014,670 A * | 1/2000 | Zamanian et al. | 707/101 |
| 6,034,681 A * | 3/2000 | Miller et al. | 345/333 |
| 6,044,212 A | 3/2000 | Flavin et al. | |
| 6,094,654 A * | 7/2000 | Van Huben et al. | 707/8 |
| 6,125,388 A * | 9/2000 | Reisman | 707/10 |
| 6,175,816 B1 | 1/2001 | Flavin et al. | |
| 6,240,335 B1 * | 5/2001 | Wehrung et al. | 700/230 |
| 6,339,775 B1 * | 5/2001 | Wehrung et al. | 707/101 |
| 6,248,540 B1 * | 6/2001 | Weinberg et al. | 435/7.1 |
| 6,339,795 B1 * | 1/2002 | Narurkar et al. | 709/246 |

OTHER PUBLICATIONS

Advanced ChemTech, "Model 90 Automated Concurrent Dual–Peptide Synthesis", 1 pg, no date.

Advanced ChemTech, "Model 348 MPS Multiple Peptide Synthesizer", product information, 4 pgs, no date.

Advanced ChemTech, "Model 496 MOS Multiple Organic Synthesizer", product information, 6 pgs, no date.

Afferent Systems, Inc., "Afferent defines libraries in terms of precursors and reactions", 3 pgs, Nov. 4, 1997, downloaded from www.afferent.com/libraries.html.

Afferent Systems, Inc., "Afferent Products", 1 pg. Jul. 10, 1998, downloaded from www.afferent.com/products.html.

Afferent Systems, Inc., "Afferent Products", 1 pg., Jan. 28, 1999, ©1996–1999, downloaded from www.afferent.com/products.html.

Afferent Systems, Inc., "Afferent uses virtual chemistry to generate combinatorial products", 6 pgs, Jul. 10, 1998, downloaded from www.afferent.com/generation.html.

Afferent Systems, Inc., "Afferent uses virtual chemistry to generate combinatorial products", 3 pgs, May 26, 1999, downloaded from www.afferent.com/generation.html.

Afferent Systems, Inc., "The Diels–Alder problem", 3 pgs, Mar. 19, 1998, ©1998, downloaded from www.afferent.com/Diels–Alder.html.

Afferent Systems, Inc., "The generic structure approach", 3 pgs, Nov. 4, 1997, ©1998, downloaded from www.afferent.com/generic–structure.html.

Afferent Systems, Inc., "stop programming your synthesis robots!", 1 pg, Jun. 24, 1999, ©1996–1999, downloaded from http://www.afferent.com/index.html.

Afferent Systems, Inc., "Talk chemistry, not robot language, to your synthesis system!", 8 pgs, Mar. 19, 1998, downloaded from www.afferent.com/control.html.

Argonaut Technologies, Trident ™ User Manual, pp. 13–61, Mar. 19, 1999.

Asymtek, "M–ENCAP", product information, 1 pg, no date.

Asymtek, "M–FCOB", product information, 1 pg, no date.

Asymtek, "M–MCM", product information, 1 pg, no date.

Cargill et al., "Automated Combinatorial Chemistry on Solid Phase", Laboratory Robotics and Automation, vol. 8, pp. 139–148, 1996.

Carl Creative Systems, "PlateTrak Automated Liquid Handling System", Technical Specifications, 1 pg, no date.

Chemical Computing Group Inc., "MOE: The Molecular Operating Environment", CCG Product Information, 4 pgs, ©1997–1998.

Labute, "MOE Deployment Strategies", Journal of the Chemical Computing Group, 6 pgs, ©1997–1998.

Matrix Technologies Corporation, "PlateMate 96/384 Automated Pipettor", User Manual, pp. 57–78, 95–108, Aug. 1997.

Mmyriad The Technology Partnership, "personal synthesis a new approach to synthesis", product information, 7 pgs, no date.

Packard, "MultiPROBE Robotic Liquid Handling Systems", product information, 3 pgs, 1995.

Rupp, "Instructions for computing of a high efficiency screening protocol for crystals", Crystool Instructions, 3 pgs, Apr. 6, 1999, downloaded from www.structure.llnl.gov/crystool/crystool_instr.htm.

Segelke, "Computing of a high efficiency screening protocol for crystals", Crystool Theory, 5 pgs, Apr. 6, 1999, downloaded from www.structure.llnl.gov/crystool/_theory.htm.

Segelke et al., "Computing of a high efficiency screening protocol for crystals", 1 pg, Mar. 23, 1999, downloaded from www.structure.llnl.gov/crystool/crystool.htm.

Titertek Instruments, Inc., Quadflex, product information, 2 pgs, no date.

XAct 1.0 for Windows 95/98, 12 pgs, Jun. 1999, downloaded from http://zombie.imsb.au.dk/xact/.

The Xact Manual, Version 1.0b2, "A Program for Automated Construction of Protein Crystallization Experiments", Windows 95/98 Version, Apr. 1999, 67 pgs.

Zinsser Analytic, "Lissy Pipetting with Windows", product information, 1 pg, no date.

\* cited by examiner

SYNTHESIZING COMBINATORIAL LIBRARIES OF MATERIALS

MICROFICHE APPENDIX

This application includes, as Appendix A, a microfiche appendix titled "Appendix A—Microfiche of Source Code", having one fiche with a total of 59 frames.

The foregoing portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to methods and apparatus for controlling automated material-handling procedures.

Traditionally, the discovery and development of materials has predominantly been a trial and error process carried out by scientists who generate data one experiment at a time. This process suffers from low success rates, long time lines and high costs, particularly as the desired materials increase in complexity. When a material is composed of multiple components, theory provides little guidance and the large variety of combinations of components takes a substantial amount of time to prepare and analyze.

Combinatorial materials science addresses some of these challenges. Combinatorial materials science refers generally to methods for creating a collection (or "library") of chemically diverse compounds or materials and/or to methods for rapidly testing or screening such libraries for desirable performance characteristics and properties. By parallel or rapid serial testing of many compounds or materials, combinatorial techniques accelerate the speed of research, facilitate breakthroughs and expand the amount of information available to researchers. Furthermore, the ability to examine the relationships between hundreds or thousands of materials in a short period of time enables scientists to make well-informed decisions in the discovery process and to identify unexpected trends.

Implementation of combinatorial screening methods depends on the ability to prepare libraries of materials using combinatorial synthetic techniques. These techniques typically employ a robot to automate library preparation and screening, and computer programs have been used to control such robots.

SUMMARY OF THE INVENTION

The invention features methods and apparatus, including computer program products, operable to control automated material handling procedures. The invention is particularly useful for controlling the automated synthesis and/or screening of combinatorial libraries, but is generally useful for controlling material handling procedures involving the transfer of materials from one or more source locations to one or more destination locations.

In general, in one aspect, the invention features a computer program on a computer-readable medium for controlling a material-handling apparatus. The program includes instructions operable to cause a programmable processor to provide an assortment of pre-programmed code objects; and receive from a user a selection and arrangement of pre-programmed code objects from the assortment. The assortment includes a first pre-programmed code object operable to receive an input defining one or more source components, one or more destination components and one or more mappings. Each mapping relates a source component and a destination component and defines one or more transfers of at least one source component material to at least one destination component locations. The selection defines a set of material handling steps. The arrangement defines an order of execution for the selected pre-programmed code objects.

Implementations of the invention can include one or more of the following advantageous features. The first pre-programmed code object is operable to interact with a user to receive a mapping. The first pre-programmed code object is operable to interact with a user to associate the source component with one or more source locations and the destination component with a destination location including an access port of an analytical device. The input is a recipe file including library design information defining the source component, the destination component and the mapping. The material handling steps define a procedure for synthesizing a combinatorial library of materials. The mapping defines a gradient for distributing the source component materials among the destination locations. The first pre-programmed code object is operable to interact with a user to associate the source component with one or more source locations, each of which has a source component material, and the destination component with a plurality of destination locations corresponding to a plurality of members of the combinatorial library. The assortment includes at least one second pre-programmed code object operable to label a mapping for processing by at least one third pre-programmed code object to be executed subsequently in the arrangement. The arrangement includes a logical hierarchy including a parent pre-programmed code object and at least one child pre-programmed code object. The parent pre-programmed code object is operable to define a condition determining whether the at least one child pre-programmed code object will be executed subsequently in the arrangement. The parent pre-programmed code object is operable to provide that the at least one child pre-programmed code object will be executed at least one time for each mapping defined by the input. The parent pre-programmed code object is operable to provide that the at least one child pre-programmed code object will be executed at least one time for each transfer defined by one of the one or more mappings. The condition is a "for" condition. The condition is a "while" condition. The condition is an "if" condition.

In general, in another aspect, the invention features a computer program for controlling an automated material-handling apparatus for carrying out a set of material-handling steps. The program includes instructions operable to cause a programmable processor to receive a recipe file comprising component information and mapping information; interact with a user to create a procedure for executing the set of material handling steps; and cause the automated material-handling apparatus to carry out the set of material-handling steps by executing the procedure. The mapping information relates a source component and a destination component. The mapping information defines one or more transfers of at least one source component material to at least one destination component location. The program includes instructions to provide to the user an assortment of pre-programmed code objects and receive from the user a selection and arrangement of the pre-programmed code objects. The procedure is defined by the user's selection and arrangement. The procedure contains at least one first pre-programmed code object operable to read and interpret the recipe file and at least one second pre-programmed code object operable to interpret a mapping read from the recipe file.

Implementations of the invention can include one or more of the following advantageous features. The program includes instructions operable to cause a programmable processor to interact with a user to create a resource hierarchy including one or more resource objects defining at least one hardware device of the automated material-handling apparatus coupled to the programmable processor. The program includes instructions operable to cause a programmable processor to interact with a user to create a system hierarchy including one or more system objects defining one or more robot arms coupled to the at least one hardware device of the automated material-handling apparatus. The program includes instructions operable to cause a programmable processor to interact with a user to create a substrate hierarchy including one or more substrate objects defining a geometry for at least one substrate. The program includes instructions operable to cause a programmable processor to interact with a user to create a one or more position objects for each substrate object in the substrate hierarchy. At least one substrate object corresponds to one or more source locations. At least one substrate object corresponds to one or more destination locations. Execution of the procedure translates the component information and the mapping information to machine level commands for controlling the automated material-handling apparatus. The program includes instructions operable to enable the user to modify the procedure during execution.

In general, in another aspect, the invention features a computer-implemented method for controlling a material-handling apparatus. The method includes providing an assortment of pre-programmed code objects; and receiving from a user a selection and arrangement of pre-programmed code objects from the assortment. The assortment includes a first pre-programmed code object operable to receive an input defining one or more source components, one or more destination components and one or more mappings. Each mapping relates a source component and a destination component and defines one or more transfers of at least one source component material to at least one destination component locations. The selection defines a set of material handling steps. The arrangement defines an order of execution for the selected pre-programmed code objects.

Implementations of the invention can include one or more of the following advantageous features. The first pre-programmed code object is operable to interact with a user to receive a mapping arrangement which defines a material-handling procedure for execution by the material-handling apparatus. The first pre-programmed code object is operable to interact with a user to associate the source component with one or more source locations and the destination component with a destination location comprising an access port of an analytical device. The input is a recipe file including library design information defining the source component, the destination component and the mapping. The material handling steps define a procedure for synthesizing a combinatorial library of materials. The mapping defines a gradient for distributing the source component materials among the destination locations. The first pre-programmed code object is operable to interact with a user to associate the source component with one or more source location, each of which has a source component material, and the destination component with a plurality of destination locations corresponding to a plurality of members of the combinatorial library. The assortment includes at least one second pre-programmed code object operable to label a mapping for processing by at least one third pre-programmed code object to be executed subsequently in the arrangement. The arrangement includes a logical hierarchy including a parent pre-programmed code object and at least one child pre-programmed code object. The parent pre-programmed code object is operable to define a condition determining whether the at least one child pre-programmed code object will be executed subsequently in the arrangement. The parent pre-programmed code object is operable to provide that the at least one child pre-programmed code object will be executed at least one time for each mapping defined by the input. The parent pre-programmed code object is operable to provide that the at least one child pre-programmed code object will be executed at least one time for each transfer defined by one of the one or more mappings. The condition is a "for" condition. The condition is a "while" condition. The condition is an "if" condition.

In general, in another aspect, the invention features a method of controlling an automated material-handling apparatus for executing a set of material-dispensing steps. The method includes receiving a recipe file comprising component information and mapping information; interacting with a user to create a procedure for synthesizing the combinatorial library; and causing the automated material-handling apparatus to synthesize the combinatorial library by executing the procedure. The mapping information relates a source component and a destination component. The mapping information defines one or more transfers of at least one source component material to at least one destination component location. The method includes providing to the user an assortment of pre-programmed code objects and receiving from the user a selection and arrangement of the pre-programmed code objects. The procedure is defined by the user's selection and arrangement. The procedure contains at least one first pre-programmed code object operable to read and interpret the recipe file and at least one second pre-programmed code object operable to interpret a mapping read from the recipe file.

Implementations of the invention can include one or more of the following advantageous features. The method includes interacting with a user to create a resource hierarchy including one or more resource objects defining at least one hardware device of the automated material-handling apparatus coupled to the programmable processor. The method includes interacting with a user to create a system hierarchy including one or more system objects defining one or more robot arms coupled to the at least one hardware device of the automated material-handling apparatus. The method includes interacting with a user to create a substrate hierarchy including one or more substrate objects defining a geometry for at least one substrate. The method includes interacting with a user to create a one or more position objects for each substrate object in the substrate hierarchy. At least one substrate object corresponds to one or more source locations. At least one substrate object corresponds to one or more destination locations. Execution of the procedure translates the component information and the mapping information to machine level commands for controlling the automated material-handling apparatus. The method includes modifying the procedure during execution.

In general, in another aspect, the invention features a system for executing a set of material-handling steps. The system includes means for receiving a recipe file comprising component information and mapping information; means for interacting with a user to create a procedure for synthesizing a combinatorial library of materials; and means for synthesizing the combinatorial library by executing the procedure. The mapping information relates a source component and a destination component and defining one or more transfers of at least one source component material to at least one destination component location. The means for interacting with the user includes means for providing to the user an assortment of pre-programmed code objects and means for receiving from the user a selection and arrangement of the pre-programmed code objects. The procedure is defined by the user's selection and arrangement. The procedure contains at least one first pre-programmed code object operable to read and interpret the recipe file and at least one second pre-programmed code object operable to interpret a mapping read from the recipe file.

Advantages that can be seen in implementations of the invention include one or more of the following. The use of code blocks allows users to create highly customized procedures for a wide variety of material-handling processes including preparation or synthesis of combinatorial libraries as well as characterization of libraries of materials. New code blocks can be generated and collections created storing code blocks for use in future procedures. Procedures can be changed on the fly to allow experimentation and process exploration. Procedures are not restricted to specific hardware. The use of code blocks in a graphical programming environment allows users to create procedures without requiring knowledge of complicated programming languages. Procedures can be run with minimal user interaction during execution. The use of high level library design data allows the synthesis of libraries designed in different design environments.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A series of user-selected procedures is used to implement a set of material-processing instructions. In one embodiment that will be described, the instructions are obtained from a recipe file for the automated synthesis of a combinatorial library of materials. Materials can include any type of chemical compound, mixture or other material of interest. The combinatorial library of materials is prepared by placing components in a destination, such as a microtiter plate, silicon wafer or the like. Each destination includes an array of regions, which may include, for example, the wells of a microtiter plate or locations on a wafer. The resulting set of materials is the library, which includes a set of "members" corresponding to materials at each region of the destination array. A library can be arranged in any convenient geometric shape, such as a square, rectangle, circle or triangle. For discussions of combinatorial strategies, library design strategies and a related discussion of regions, see U.S. application Ser. No. 09/156,827, filed Sep. 18, 1998, and U.S. application Ser. No. 09/174,856, filed on Oct. 19, 1998, and U.S. Pat. No. 5,776,359, all of which are incorporated herein by reference in their entireties.

Figure 1:
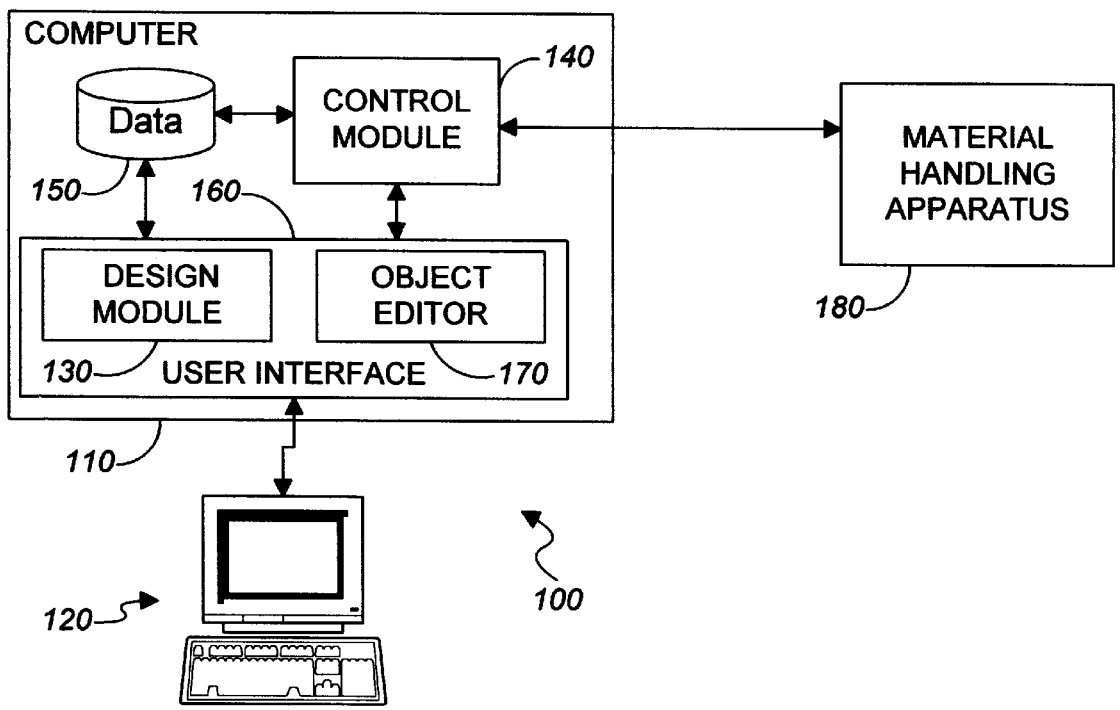
FIG. 1 is a block diagram illustrating a system for controlling an automated material handling procedure.
Figure 2:
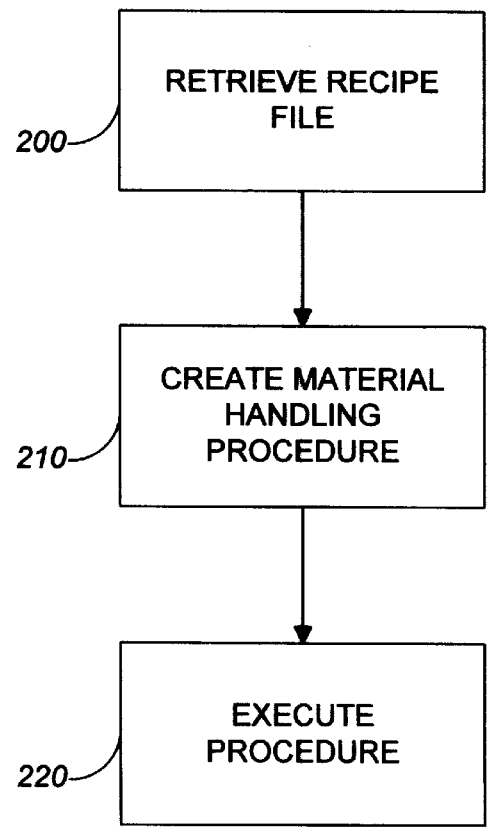
FIG. 2 is a flow diagram generally illustrating a method of controlling an automated material handling procedure.

As shown in FIGS. 1 and 2, a system 100 includes a computer 110 equipped with input/output devices 120. A set of material handling instructions is generated in design module 130 and provided to control module 140 (step 200). Alternatively, control module 140 retrieves instructions from memory 150. Suitable instructions can be provided in a "Recipe file" and can include, for example, component information identifying source and destination components (representing physical containers such as vials or microtiter plates or physical locations such as regions on a substrate wafer) to be used in the synthesis of a library, mapping information relating each source to one or more destination components and identifying amounts of each source to be used to synthesize each library member, and parameters defining reaction conditions for the combination of components to form individual library members.

Mapping information can include, for example, a list of specific amounts of materials to be transferred from one or more source vials to each of a set of destination wells. Mapping information can also include gradients specifying a range of amounts of a material or materials to be transferred from a particular source to a series of wells, with the amount to be transferred to each destination well determined according to a linear, exponential, logarithmic, polynomial, geometric or other mathematical expression. The creation of recipe files is described in co-pending U.S. application Ser. No. 09/174,856, filed on Oct. 19, 1998, which is incorporated herein by reference in its entirety. Control module 140 captures the component, mapping and parameter information from a recipe file and makes the information available for use by user-defined procedures as will be described below.

A typical user of system 100 is a chemist. Through user interface 160, the user initializes system 100 and creates a procedure using object editor 170 (step 210). Control module 140 executes the procedure (step 220), causing material handling apparatus 180 to, for example, synthesize a combinatorial library specified by the set of instructions in the recipe file. In the described embodiment, control module 140 communicates directly with apparatus 180, for example, by transmitting text commands through a serial port or ports to apparatus 180. Alternatively, commands generated by module 140 can be implemented by drivers for apparatus 180 installed on computer 110.

Appropriate apparatus 180 can include, for example, automated liquid handling robots, such as the RSP 900 Robotic Sample Processor, available from Cavro Scientific Instruments, Inc. of Sunnyvale, Calif., or equivalents. Apparatus 180 can also include automated systems performing different types of physical or chemical vapor deposition. In liquid handling, mixtures of solutions are typically dispensed in an array of miniature wells to create a library. In vacuum deposition, solid elements or chemicals or mixtures of solid elements or chemicals are vaporized and deposited as individual components on a substrate. The deposition may be controlled by a series of shutters and masks to manufacture the library. For an example of deposition equipment, see WO98/47613 (U.S. application Ser. No. 08/841,423), filed on Apr. 22, 1997.

Figure 3:
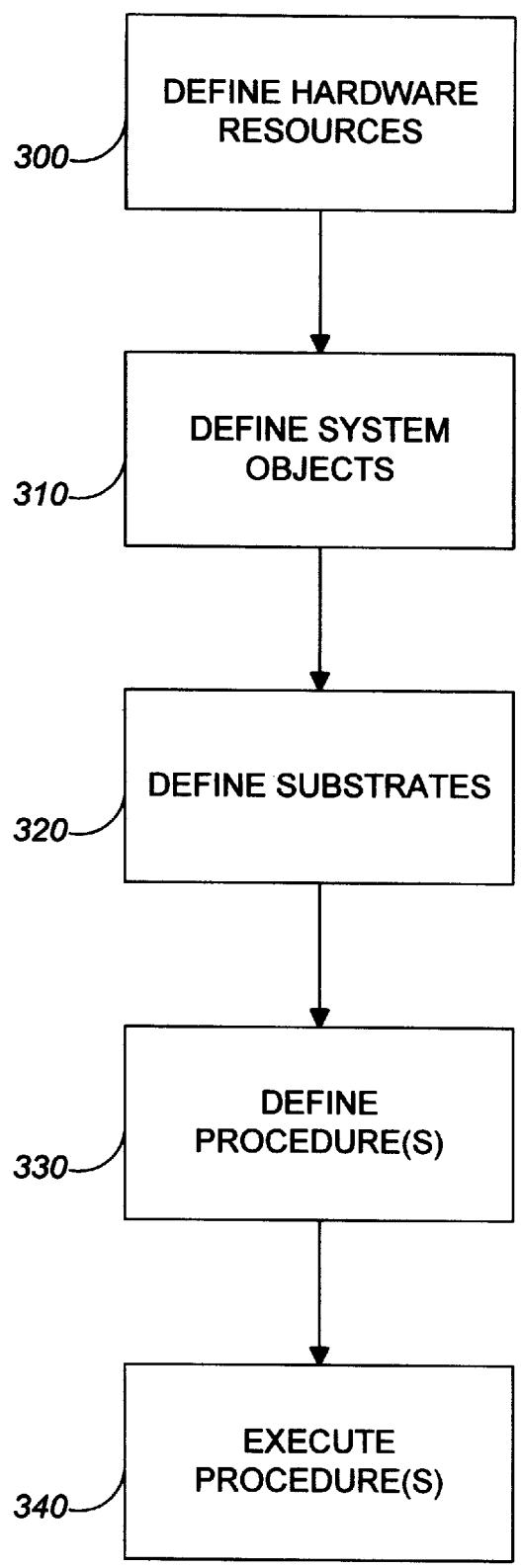
FIG. 3 is a flow diagram illustrating a method of controlling an automated material handling procedure in more detail.

Referring to FIG. 3, a method of using system 100 to synthesize a combinatorial library of materials is described in more detail. In each of the first four steps of the method (steps 300, 310, 320 and 330), the user employs object editor 170 to create and configure data objects defining the hardware and processes for the desired synthesis. Each data object has an associated set of properties. The user selects and inserts data objects into a hierarchy of objects defining the hardware and processes for the system, and customizes the selected objects by manipulating the properties associated with each object as will be described in more detail below. Data objects are generated by the editor 170 through the use of computer programming techniques conventional in object-oriented programming. The editor is advantageously implemented to have a graphical user interface.

Figure 4:
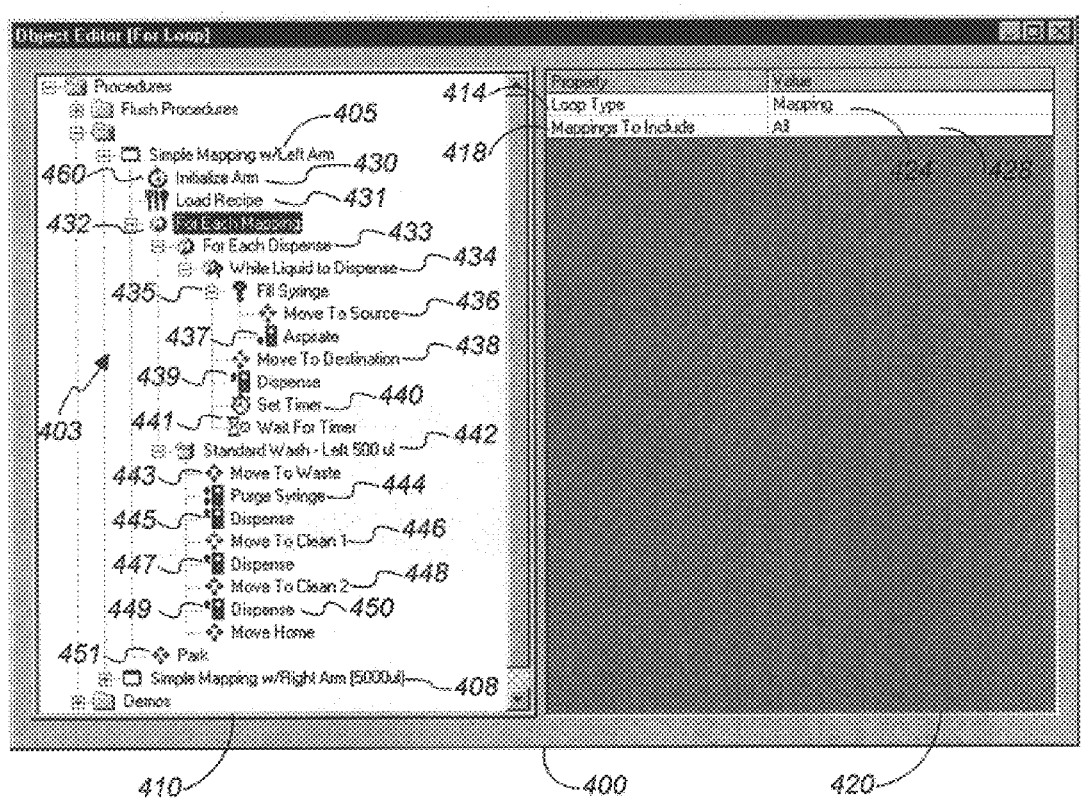
FIG. 4 is an example of a dialog window displaying a procedure generated according to the claimed invention.

In one embodiment, as shown in FIG. 4, user interface 160 displays window 400 including an object hierarchy or tree 403 (in this case for procedure objects 405 and 408) in pane 410. The user manipulates the properties of selected objects—for example, properties 414 and 418 of selected For Loop object 432—by entering text or selecting values in the corresponding fields of pane 420, in this example, fields 424 and 428. The user need not have any familiarity with the generation of the data objects themselves, or of the object-oriented programming techniques used to generate the data objects, in order to manipulate data objects as described below.

Referring again to FIG. 3, the user defines the physical hardware resources available to system 100 through user interface 160 (step 300). As described above, appropriate hardware resources includes devices such as automated synthesis robots, syringe pump controllers, physical and vapor deposition systems and the like. Hardware resources can also include temperature controllers for regulating the temperature of one or more source or destination vials or plates, syringes or other dispensing apparatus. The user defines each hardware device attached to system 100 by creating a hardware resource data object specifically configured for the device in question, for example, specifying a serial port through which the device is attached to computer 110. Each hardware resource object implements a protocol for communication between computer 110 and the particular device in question, giving computer 110 (and the user) access to the device's functionality.

The user defines the properties of the specific arms, syringes, shutters, masks or other devices installed in system 100 by creating system data objects for each such device (step 310). Each system object identifies a hardware resource selected from those already defined (e.g., a particular robot or pump controller) that will control the device in question. Other system object properties include the device address, the configuration of syringes attached to an arm (e.g., in series or in parallel), motion limits, step size and reference positions for arm movements, and resolution, volume and dispensing characteristics for syringes and the like.

The user also identifies each source of starting materials and each destination by creating a substrate data object defining the geometry for each single-well or multi-well substrate to be accessed by system 100; specific positions for these substrates on the work surface are defined using position objects, which the user inserts as child objects of the respective substrate object (step 320). For a substrate object corresponding to a single well substrate or vial, user-defined properties include, for example, the vial's cross-sectional area and height, as well as the position at which the system will dispense liquid into the vial. A vial position object associated with each vial defines the coordinates of the vial's location on the work surface. Properties for two-dimensional substrate arrays include, for example, all of those associated with the single well substrate, as well as the number of rows and columns and the relevant spacing. A plate position object defines the location of the two-dimensional array on the work surface by specifying, for example, grid coordinates of opposite corners of the array.

Figure 5:
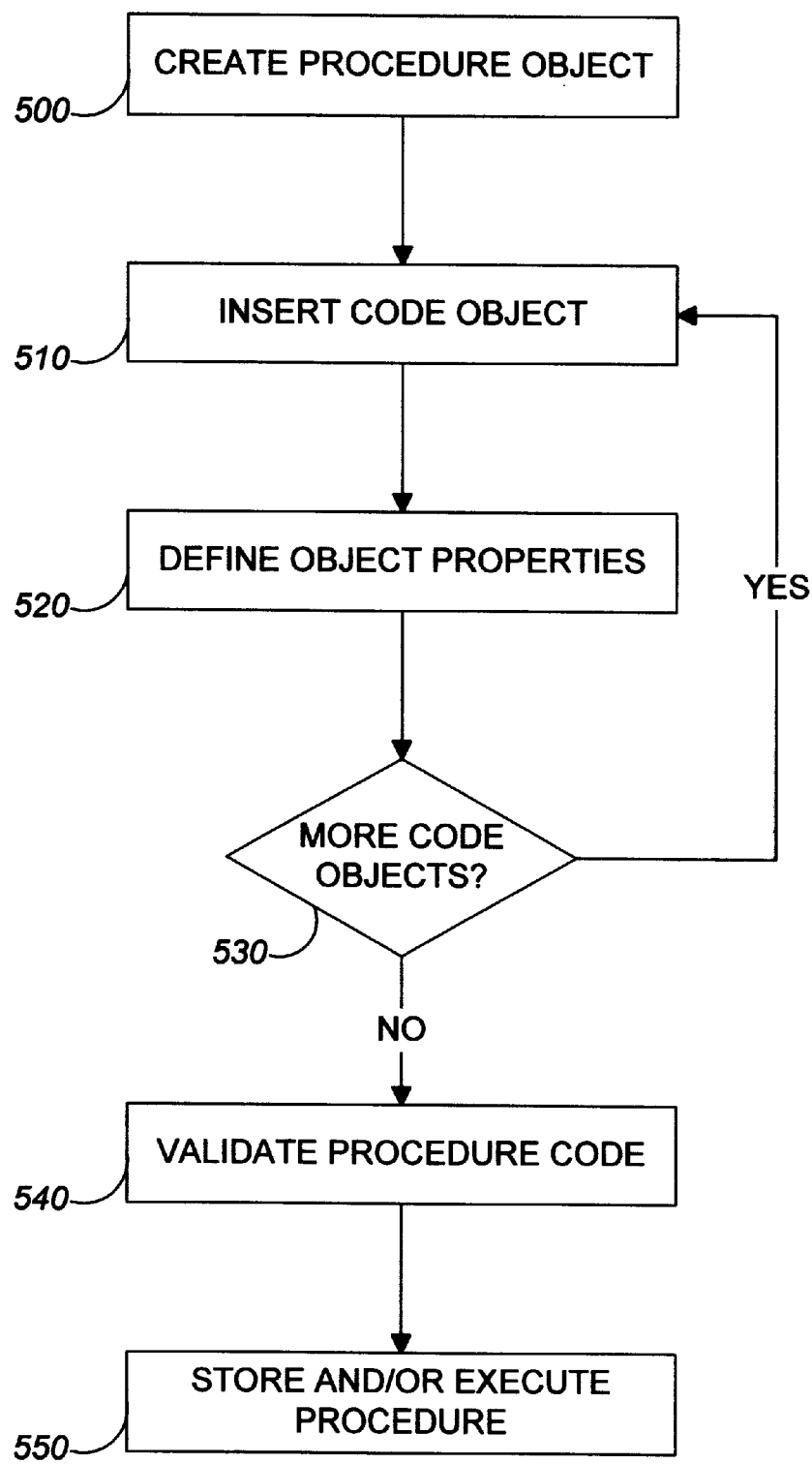
FIG. 5 is a flow diagram illustrating a method of generating a procedure.

The user creates a procedure object (step 330) by assembling a hierarchy of code objects that can be executed by control module 140 and robot 180. The process of using object editor 170 to create a liquid-dispensing procedure is described in reference to FIG. 5. The user creates a procedure object using object editor 170 (step 500). The user selects a code object for performing a desired function—such as loading synthesis instructions, initializing one or more robot arms, setting parameters for arm and syringe movement, moving arms, aspirating or dispensing liquids with syringes and the like—from a set of objects accessible by object editor 170 and inserts the object at the appropriate location in the procedure object's logical hierarchy (step 510). The user can also select a "container" object from a code library. As suggested by the name, container objects are containers used to group other objects into functional units, which can then be saved, copied and inserted into other procedures as a unit. Container objects can include conditional "For Loop", "If" and "While Loop" objects including one or more functional descendant or child objects that are executed zero, one or more times in a procedure according to the occurrence of a specified condition, as is described in more detail below.

An example of a selection of suitable code objects is provided in Table 1, below.

TABLE 1

| Object Name | Properties | Description |
| --- | --- | --- |
| Aspirate | Arm | Arm containing the desired syringe, selected from arms defined for system |
|  | Syringe | Syringe with which to aspirate, selected from syringes defined for arm |
|  | Wait for Completion | Wait for command to complete before continuing (Yes or No) |

TABLE 1-continued

| Object Name | Properties | Description |
|---|---|---|
| | Liquid Detect Sensitivity | Type of liquid level sensing, selected from Low or High, which cause robot to detect liquid surface before aspirating, or None |
| | Submerge Distance | Distance to submerge tip when liquid detection in use |
| | Liquid Detect Failure Recovery | System response when liquid detection fails, selected from Prompt User or Remain at Z Max |
| | Aspirate Mode | Type of liquid being aspirated, selected from Reagent, Air Gap or Overshoot |
| | Volume Type | Constant or Variable |
| | Volume | Volume to aspirate or variable name |
| | Update Volume | If Yes, variable containing aspirate volume updated to reflect actual volume of liquid aspirated |
| Container | Author | User-defined text comment |
| | Date | User-defined text comment |
| | Comments | User-defined text comment |
| Define Variable | Initial Value | Initial numeric value for the variable |
| | Prompt User for Value | If Yes, user is prompted to supply value; if No, variable initialized with Initial Value |
| | Prompt Text | Text displayed when prompting user for initial value |
| Dispense | Arm | Arm containing the desired syringe, selected from arms defined for system |
| | Syringe | Syringe with which to dispense, selected from syringes defined for specified arm |
| | Wait for Completion | Wait for command to complete before continuing (Yes or No) |
| | Liquid Detect Sensitivity | Type of liquid level sensing, selected from Low or High, which cause robot to detect liquid surface before dispensing, or None |
| | Submerge Distance | Distance to submerge tip when liquid detection in use |
| | Liquid Detect Failure Recovery | System response when liquid detection fails, selected from Prompt User or Remain at Z Max |
| | Dispense Mode | Type of liquid being dispensed, selected from Reagent or Solvent |
| | Volume Type | Constant or Variable |
| | Volume | Volume to dispense or variable name |
| | Update Volume | If Yes, variable containing dispense volume updated to reflect actual volume of liquid dispensed |
| Fill Syringe | Arm | Arm containing the desired syringe, selected from arms defined for system |
| | Syringe | Syringe to be filled, selected from syringes defined for specified arm |
| | Wait for Completion | Wait for command to complete before continuing (Yes or No) |
| | Volume Type | Constant or Variable |
| | Volume | Fill volume or variable name |
| | Update Volume | If Yes, variable containing fill volume updated to reflect actual volume of liquid drawn from reservoir |
| For Loop | Loop Type | Mapping, Dispense or Numeric. If Mapping, object iterates through mappings loaded on system; ifDispense, object iterates through each dispense within current mapping; ifNumeric, object iterates through specified integer range. |
| | Mappings to Include | All or selected (Tagged) mappings included in iteration |
| | Mapping Tag | Specifies tag to match when iterating through mappings; only mappings with specified tag included in loop |
| | Lookahead Interval Type | Constant or Variable |
| | Lookahead Interval | Number of wells to consider when calculating mapping aspirate amount or variable name |
| | Loop Variable | Name of variable containing numeric loop's current value |
| | Initial Value Type | Constant or Variable |
| | Initial Value | Initial Value or variable name |
| | Final Value Type | Constant or Variable |
| | Final Value | Final Value or variable name |

TABLE 1-continued

| Object Name | Properties | Description |
| --- | --- | --- |
| Get Temperature | Controller | Temperature controller to use, selected from controllers.defined for system |
| | Channel Type | Constant or Variable |
| | Channel | Channel number or variable name |
| | Temperature Variable | Name of variable into which retrieved temperature value should be put |
| Get Timer | Timer ID | ID of timer to be queried |
| | Timer Variable | Name of variable into which retrieved timer value should be put |
| | Desired Value | If Elapsed Time, Timer Variable is updated with number of seconds elapsed since specified timer was set; ifRemaining Time, Timer Variable is updated with number of seconds remaining before timer expires |
| If | Condition | Condition used for comparison, selected from logical conditions (A < B, A <= B, A = B, A >= B, A > B, A != B, A MOD B), syringe conditions (Syringe Empty (Reagent), Syringe Empty (Solvent)), or mapping conditions (Mapping Tag, Not Mapping Tag) |
| | "A" | Name of variable containing "A" value |
| | "B" Data Type | "B" value specified by Constant or Variable. |
| | "B" | "B" Value or variable name |
| | Arm | Arm containing the desired syringe, selected from arms defined for system |
| | Syringe | Syringe to be queried, selected from syringes defined for specified arm |
| | Mapping Tag | String to compare with current mapping's tag. |
| Initialize Arm | Arm | Arm to initialize, selected from arms defined for system |
| | Initialize | If Arm & Syringes, arm and all associated syringes are initialized; if Arm Only, only arm is initialized. |
| Load Recipe | Prompt User For Filename | If Yes, user prompted to select recipe; if No, recipe specified by Filename is loaded. |
| | Prompt Text | Text displayed when prompting user for filename |
| | Filename | Path of recipe file to load |
| Move Arm | Arm | Arm to move, selected from arms defined for system |
| | Wait For Completion | Wait for command to complete before continuing (Yes or No) |
| | Destination | Mapping Source, Mapping Destination, Substrate, Absolute Position or Relative Position to which arm is to move |
| | Z Position | Z position to move to when destination is a substrate well |
| | Substrate | Destination substrate, selected from list of substrates defined for system |
| | Position | Position of destination substrate on work surface, selected from list of positions defined for selected substrate |
| | Well Specifier | Row and column numbers or well number of substrate well |
| | Row Type | Constant or Variable |
| | Row | Destination well's row number or variable name |
| | Column Type | Constant or Variable |
| | Column | Destination well's column number or variable name |
| | Well Number Type | Constant or Variable. |
| | Well Number | Destination well's well number or variable name |
| | Absolute X, Y & Z | X, Y and Z coordinates of the destination position |
| | Relative X, Y & Z | Relative amounts to move arm in X, Y and Z |
| Pause | Prompt Text | Text displayed in pause dialog |
| Purge Syringe | Arm | Arm containing desired syringe, selected from arms defined for system |
| | Syringe | Syringe to purge, selected from syringes defined for specified arm |
| | Wait for Completion | Wait for command to complete before continuing (Yes or No) |
| Sample Map | Prompt Text | Text displayed in dialog box |
| | Well Status Variable | Defines variable to store status of each well in source substrate |
| | Default | Specifies default number of samples per well |

TABLE 1-continued

| Object Name | Properties | Description |
|---|---|---|
| | Samples Per Well | |
| | Default Source Substrate | Source substrate displayed by default during execution, selected from vials and plates defined for system |
| | Default Source Position | Position of source substrate displayed by default during execution, selected from positions defined for selected substrate |
| | Injection Port | Injection port substrate, selected from vials defined for system |
| | Injection Port Position | Position of injection port substrate on work surface, selected from positions defined for selected substrate |
| Send NI-DAQ Command | Command | NI-DAQ command to send to National Instruments data acquisition card, selected from available commands in National Instruments Data Acquisition library |
| | Chassis | SCXI chassis ID |
| | Module | Module slot number |
| | Channel Type | Constant or Variable |
| | Channel | Channel number or variable name |
| | Channel Data | Data to send to specified channel |
| Send Resource Command | Device | Target resource, selected from resources defined for system. |
| | Address | Address of the target device on the selected resource |
| | Command | Command text to send to specified device |
| Send Serial Command | Port | Communications port resource to use, selected from communications ports defined for system |
| | Command | Command text to send out selected port |
| | Termination | Characters to append to command string |
| Set Arm Speeds | Arm | Arm to set, selected from arms defined for system |
| | Wait for Completion | Wait for command to complete before continuing (Yes or No) |
| | X, Y and Z Axis Start Speed | Initial speed specified arm will have during any motion |
| | X, Y and Z End Speed | Top speed specified arm will attain during any motion |
| | X, Y and Z Axis Acceleration | Acceleration specified arm will have during any motion |
| Set Arm Z Heights | Arm | Arm to set, selected from arms defined for system |
| | Wait for Completion | Wait for command to complete before continuing (Yes or No) |
| | Z Max | Lowest position specified arm will travel when searching for liquid |
| | Z Start | Z position from which liquid detection will start |
| | Z Dispense | Z position from which liquid will be dispensed |
| | Z Travel | Z position to use when moving in X and Y |
| Set Syringe Limits | Arm | Arm containing desired syringe, selected from arms defined for system |
| | Syringe | Syringe to configure, selected from syringes defined for specified arm |
| | Max Aspirate Volume | Maximum amount of liquid selected syringe will aspirate |
| | Min Dispense Volume | Minimum amount of liquid selected syringe will dispense |
| Set Syringe Speeds | Arm | Arm containing desired syringe, selected from arms defined for system |
| | Syringe | Syringe to configure, selected from syringes defined for specified arm |
| | Wait for Completion | Wait for command to complete before continuing (Yes or No) |
| | Start Speed | Initial speed specified syringe will have during any motion |
| | Top Speed | Top speed specified syringe will attain during any motion |
| | Cutoff Speed | Speed specified syringe will have when motion is stopped |
| | Slope | Specifies how quickly syringe will ramp up from initial speed to top speed and down from top speed to cutoff speed |
| | Frequency | Frequency at which dispenser solenoid opened and closed during aspiration and dispensing |

TABLE 1-continued

| Object Name | Properties | Description |
|---|---|---|
| | Duty Cycle | Percentage of time dispenser solenoid will be open during each open/close cycle. |
| Set Temperature | Controller | Temperature controller to use, selected from controllers defined for system |
| | Channel Type | Constant or Variable |
| | Channel | Channel number or variable name |
| | Set Point Type | Constant or Variable |
| | Set Point | Temperature set point in degrees or variable name |
| Set Timer | Timer ID | Unique number to associate with time, used when querying or waiting on timer |
| | Duration Type | Constant or Variable. |
| | Duration | Timer's duration or variable name |
| Simple Math | Function | Desired mathematical function, selected from addition, subtraction, multiplication, division, increment and decrement |
| | "A" | Name variable "A" to be updated with the result of the function |
| | "B" Data Type | Constant or Variable. |
| | "B" | "B" value or variable name |
| | "C" Data Type | Constant or Variable. |
| | "C" | "C" value or variable name |
| Status Message | Message Type | Text or Variable Value |
| | Message Text | Text to post to event log |
| | Variable | Variable to post to event log |
| Tag Mappings | Prompt Text | Text to display when prompting user to select mappings |
| | Mapping Tag | String identifier to associate with selected mappings |
| | Hide Tagged Mappings | If Yes, user will see only mappings not yet tagged; if No, user will see all mappings loaded from recipes |
| Wait for Arm | Arm | Arm on which to wait, selected from arms defined for system |
| Wait for Syringe | Arm | Arm containing desired syringe, selected from arms defined for system |
| | Syringe | Syringe on which to wait, selected from syringes defined for specified arm |
| Wait for Temperature | Controller | Temperature controller to use, selected from controllers defined for system |
| | Channel Type | Constant or Variable |
| | Channel | Channel number of controller on which to wait or variable name |
| Wait for Timer | Timer ID | ID of timer on which to wait |
| While Loop | Condition | Condition used for comparison, selected from logical conditions (A < B, A <= B, A = B, A >= B, A > B, A != B, A MOD B), syringe conditions (Syringe Empty (Reagent), Syringe Empty (Solvent)), or mapping conditions (Mapping Tag, Not Mapping Tag) |
| | "A" | Name of variable containing "A" value |
| | "B" Data Type | "B" value specified by Constant or Variable. |
| | "B" | "B" Value or variable name |
| | Arm | Arm containing the desired syringe, selected from arms defined for system |
| | Syringe | Syringe to be queried, selected from syringes defined for specified arm |
| | Mapping Tag | String to compare with current mapping's tag. |

The user defines the properties associated with the chosen code object (step 520). If additional code objects are required to complete the procedure (the YES branch of step 530), the user selects the next desired code object (step 510) and repeats the process. When the last code object has been selected and defined (the NO branch of step 530), the procedure is complete. At this point, or at any time during creation of the procedure, the user can validate the code to verify the consistency of the procedure, or any selected code object and its descendants (step 540). Object editor 170 stores the procedure in memory 150 and/or provides the procedure to control module 140 for execution by apparatus 180 (step 550).

A sample procedure generated according to the steps discussed above is illustrated in FIG. 4. Procedure object 405, which the user has named "Simple Mapping w/ Left Arm", includes tree 403 of code objects 430–451. Each code object in tree 403 is represented by an icon, for example icon 460, which corresponds to the object type, and by a name, which can be a default name based on the object type or a name chosen by the user. Procedure 405 includes a series of code objects that, when executed, cause control module 140 to instruct apparatus 180 to carry out a simple mapping procedure with the left arm of a synthesis robot. Control module 140 executes procedure 405 as follows.

"Initialize Arm" object 430 initializes an arm of the robot, setting the arm and syringe speeds and the syringe maximum aspirate and minimum dispense volumes to default values. "Load Recipe" object 431 loads component, mapping and parameter information from a specified recipe file. As described above, a suitable recipe file contains component information identifying the source and destination components to used during execution of the procedure, as well as mapping information specifying amounts to be transferred from each source component to one or more destination components. The recipe file can also contain parameter information, in the form of values or sets of values associated with components identified in the recipe file.

Execution of "Load Recipe" object 431 causes control module 140 to prompt the user for the name of a recipe file to load. Optionally, a specific recipe file can be identified as a property of "Load Recipe" object 431. Control module 140 loads the specified recipe file and causes user interface 160 to display tables of component and mapping information. Control module 140 prompts the user to identify and provide a position on the work surface for each substrate component defined in step 320, discussed above. A given substrate can be used as a source (e.g., a location from which a reagent is transferred), a destination (a location to which a reagent is transferred), or both (e.g., a location in which two or more reagents are mixed and the mixture transferred to another location) during execution of a procedure. Any parameter data in the recipe file is associated with the specified substrate objects, and is made available to subsequent code objects in procedure 405. Thus, for example, if the recipe file loaded by object 431 contained "Temperature" parameter information including a value for each well in a specified destination plate, those values would be available to subsequent code objects invoking a predefined "Temperature" variable defined using a "Define Variable" object as set out in Table 1 and discussed in more detail below. A set of "Temperature" parameters can be advantageously invoked by "Set Temperature", "Get Temperature" and "Wait for Temperature" objects as set out in Table 1.

"For Each Mapping" object 432 is a container object—specifically a For Loop object—that executes its set of child objects for a specified number of iterations. In this case, object 432 is a "mapping loop" that iterates over each mapping in the recipe file loaded by "Load Recipe" object 431. Object 432 causes control module 140 to define a "Total Mappings" variable that contains the total number of mappings loaded from the recipe file, and a "Mapping Number" variable that is set to the index of the current mapping and ranges from one to the value of Total Mappings. Both of these variables are available to all child objects of loop object 432. The child objects of loop 432 are objects 433–450, which are executed by control module 140 for each loaded mapping.

"For Each Dispense" object 433 is another For Loop object, this time iterating through each dispense specified in the current mapping (corresponding to the mapping identified by the Mapping Number variable discussed above). Object 433 causes control module 140 to define eight system variables available to all child objects of loop object 433. These include a "Total Dispenses" variable containing the number of dispenses for the current mapping and a "Dispense Number" variable containing the index of the current dispense and ranging from one to the value of "Total Dispenses". These variables also include a "Mapping Aspirate Volume" variable containing the volume to aspirate (or retrieve from a source component), based on the mapping destination well (or on multiple wells based on a predetermined "look ahead interval" specifying a set number of wells to be considered when calculating the amount to aspirate) and a "Mapping Dispense Volume" variable containing the volume to dispense for the current mapping destination; for each dispense, both of these variables are initialized to preset values for the dispense and are updated as the dispense progresses. Finally, object 433 also causes control module 140 to define "Source Row" and "Source Column" variables indicating the row and column of the current source well and "Destination Row" and "Destination Column" variables indicating the row and column of the current destination well. The child objects for loop object 433 are objects 434–441, which are repeated in sequence for each dispense in each loaded mapping.

"While Liquid to Dispense" object 434 is another type of container object—a While Loop object—that causes all child objects to be executed repeatedly as long as a specified condition is true. In this case, object 434 causes control module 140 to determine whether the value of the Mapping Dispense Volume variable is greater than zero, indicating that the dispense still calls for liquid to be dispensed. For as long as this expression evaluates to true, control module 140 executes child objects 435–441. When the expression evaluates to false (i.e., no volume remains to be dispensed), the current dispense is complete and control module 140 proceeds to the next iteration of "For Each Dispense" loop 433. "While" object 434 can implement any convenient logical expression, such as arithmetic expressions comparing one value with another value. While Loop object 434 can also implement "syringe conditions" that evaluate whether a given syringe needs to be refilled, or "mapping tag" conditions that evaluate whether the current mapping has been identified for particular action by the user.

"Fill Syringe" object 435 is still another container object—an If object—that causes control module 140 to execute its child objects if a specified condition is true. In this case, object 435 causes control module 140 to determine whether the specified syringe must be refilled (i.e., when a "syringe empty" condition evaluates to "true"). Here, when the syringe is empty, object 435 causes control module 140 to execute "Move to Source" object 436, a Move Arm object that instructs apparatus 180 to move the syringe to the location of the specified source component, and Aspirate object 437, which instructs the syringe to aspirate from that source component an amount determined by the "Mapping Aspirate Volume" variable defined for the current dispense.

When the syringe is not empty, "Move to Destination" object 438 (another Move Arm object) causes apparatus 180 to move the loaded syringe to the location of the specified destination component. "Dispense" object 439 causes apparatus 180 to dispense into the specified destination well an amount determined by the Mapping Dispense Volume variable defined for the current dispense. "Set Timer" and "Wait For Timer" objects 440 and 441 cause control module 140 to pause for a preset (or variable) period of time before proceeding to the next dispense iteration.

Figure 6:
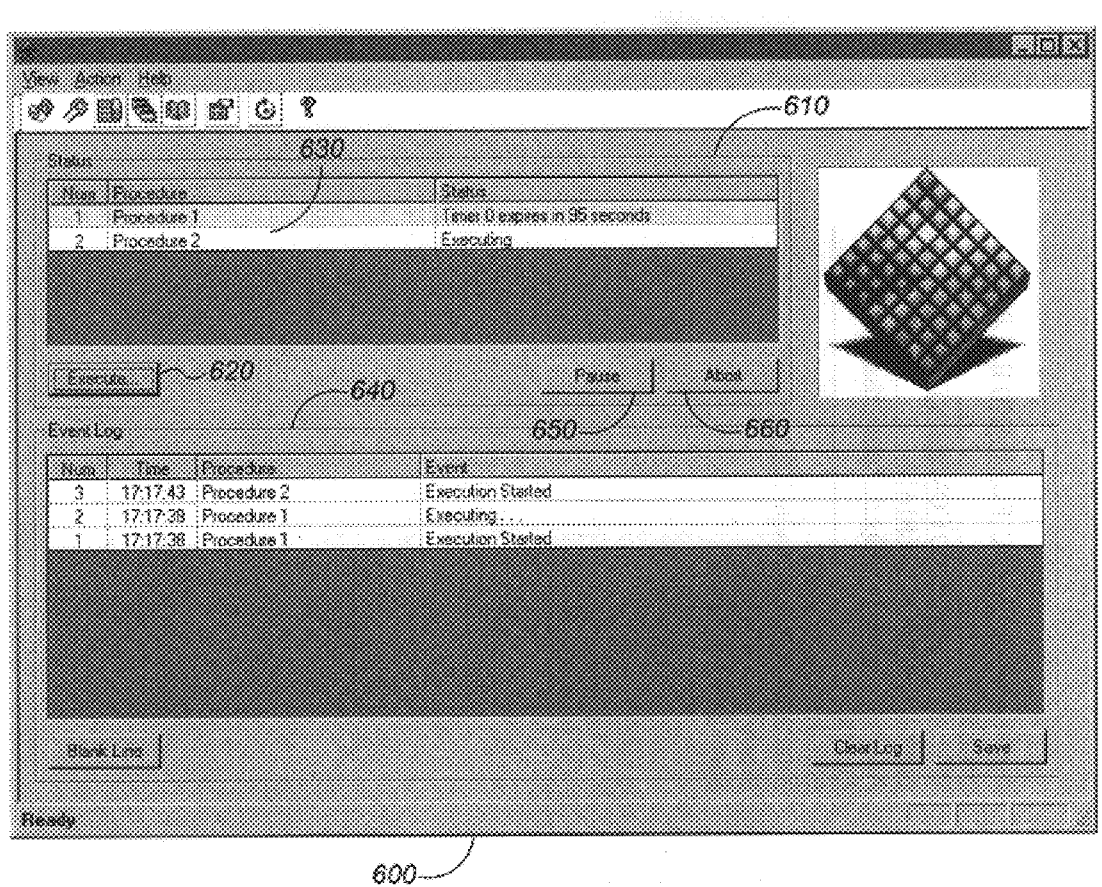
FIG. 6 is an example of a dialog window displaying a list of procedures and an event log according to the claimed invention.

After completing all dispenses for the current mapping (and after each successive mapping), control module 140 executes Container object 442, named "Standard Wash— Left 500 ul". "Move To Waste" object 443, another Move Arm object, causes apparatus 180 to move the syringe to the location of a "waste" destination. "Purge Syringe" object 444 causes apparatus 180 to empty all contents of the specified syringe into the waste destination. "Dispense" object 445 causes apparatus 180 to refill the specified syringe with a specified volume from a reservoir (typically filled with a solvent such as, for example, water) and dispense the specified volume. Control module 140 causes apparatus 180 to move the specified syringe to a cleaning station ("Move To Clean 1" object 446), where the syringe is again filled with solvent, which is dispensed (Dispense object 447). "Move To Clean 2" object 448 causes apparatus 180 to move the specified syringe to a second cleaning station, for a final wash ("Dispense" object 449). "Move Home" object 450 causes apparatus 180 to move the specified arm back to a home position, from which the next mapping iteration begins. When all mappings have been processed, "Park" object 451 (a final Move Arm object) causes apparatus 180 to return the arm to its home position. Exemplary source code for the "Procedure", "For Loop", "Load Recipe" and "Aspirate" code blocks is provided in microfiche Appendix A FIG. 6 shows a user interface window 600. The user instructs control module 140 to execute a completed procedure, for example by activating "Execute" button 620 in status pane 610 of window 600, which causes user interface 160 to display a list of available procedures in computer 110. Status pane 610 includes a line item 630 indicating that control module 140 is executing a procedure. While a procedure executes, user interface 160 displays status messages in event log 640. The user can pause or abort a procedure during execution by selecting the appropriate line item and activating button 650 or 660, respectively.

Depending on the user's preference, event log 640 can provide a record of high level events, or it can provide a detailed record of each step in a procedure. Event log 640 also displays any errors occurring during execution. When an error occurs, control module 140 pauses the executing procedure and posts the error to event log 640. While the procedure is paused, the user can execute other procedures in order to correct the error. For example, if the error resulted from a mistrained substrate position, the user can attempt to retrain the position. The user can also modify the paused procedure itself using object editor 170. When the error has been corrected, the user instructs control module 140 to resume execution of the original procedure by again activating "pause" button 650. Control module 140 reattempts the failed command, and, if it completes successfully, continues execution of the procedure.

Figure 7:
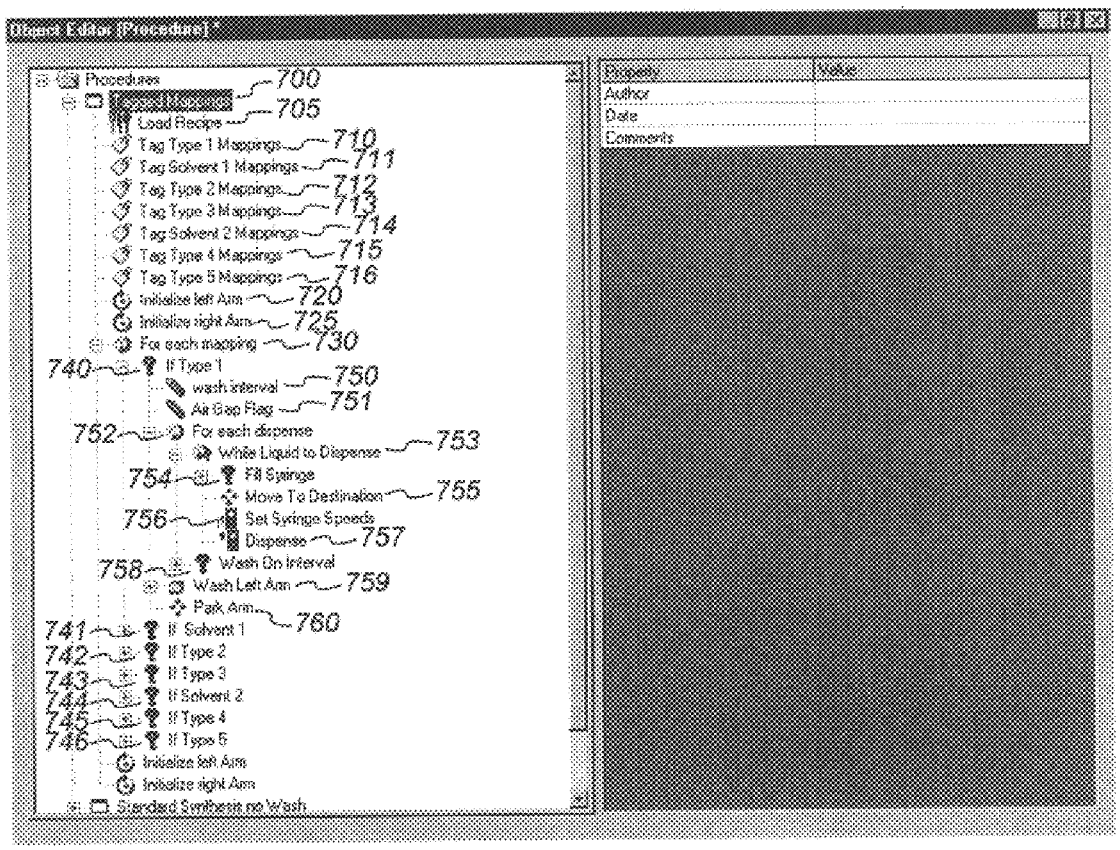
FIG. 7 is a window illustrating a procedure for processing multiple tagged mappings.

Using the techniques described above, the user can customize procedures for a wide variety of automated processes. One such procedure 700, named "Tagged Mappings", is illustrated in FIG. 7. "Load Recipe" object 705 retrieves a recipe file from memory as discussed above in reference to procedure 405. Instead of simply iterating through each mapping in the recipe file, as described in reference to that procedure, however, procedure 700 allows the user to specify different treatment for specific mappings or groups of mappings. Tag Mapping objects 710–716 cause control module 140 to prompt the user to select one or more mappings for "tagging". For example, "Tag Type 1 Mappings" object 710 prompts the user to identify mappings in the loaded recipe file to be labeled or "tagged" as "Type 1" mappings in subsequent processing steps. Alternatively, mapping tags can be specified in the recipe file loaded by "Load Recipe" object 705. The tag for each Tag Mapping object is specified during creation of the procedure, and can be any combination of characters desired by the procedure's creator. Thus, tags can be selected to identify mappings as corresponding to particular types of materials or chemistries, such as, for example,—e.g., solvents, reagents, monomers, initiators, catalysts, surfactants and the like.

After the robot arms are initialized by objects 720 and 725, procedure 700 carries out the mapping processes specified by "For Each Mapping" object 730. Instead of simply repeating the same processing steps for each mapping in the recipe file, as described for procedure 405 ("For Each Mapping" object 432) above, procedure 700 includes a series of If objects 740–746, which correspond to the mapping tags defined by objects 710–716. As shown for "If Type 1" object 740, each If object 740–746 contains a series of child objects implementing a set of process steps for each mapping identified by the corresponding tag. Thus, "If Type 1" object 740 and its child objects 750–760 define a series of processing steps for recipe file mappings the user has identified with the "Type 1" tag. "Wash Interval" object 750 and "Air Gap Flag" object 751 are Define Variable objects that cause control module 140 to define a pair of variables that will be available to subsequent code objects in If object 740. "For Each Dispense" object 752 is a For Loop object that iterates through its child objects 753–758 for each dispense of each "Type 1" mapping. "While Liquid to Dispense" object 753 is a While Loop object that iterates through its child objects 754–757 for as long as liquid remains to be dispensed in the current dispense cycle. "Fill Syringe" object 754 is an If object that carries out a series of steps causing the syringe to refill when it becomes empty (using the "Air Gap Flag" variable defined by object 751 to identify when an air gap should be aspirated during the syringe-filling process). "Move to Destination" object 755 causes apparatus 180 to move the specified hardware device to the next destination location, and "Dispense" object 757 causes apparatus 180 to deposit a specified amount of liquid at that location at a speed set by "Set Syringe Speeds" object 756. When the dispense is complete, "For Each Dispense" object 752 causes control module 140 to iterate to the next dispense in the "Type 1" mapping, causing apparatus 180 to wash the syringe tip according to "Wash On Interval" object 758 (and its child objects) at intervals defined by the "Wash Interval" variable defined by object 750. When all dispenses in the "Type 1" mapping have been processed, control module 140 instructs apparatus 180 to wash the syringe tip according to a process defined by "Wash Left Arm" object 759 and its child objects, and to move the arm to a final position ("Park" object 760).

In a similar fashion, If objects 741–746 each contain a series of child objects setting out processing steps for implementing dispenses associated with each of the remaining groups of tagged mappings in the recipe file. When each tagged mapping has been processed according to the appropriate If object and its child objects, the library synthesis is complete.

Figure 8:
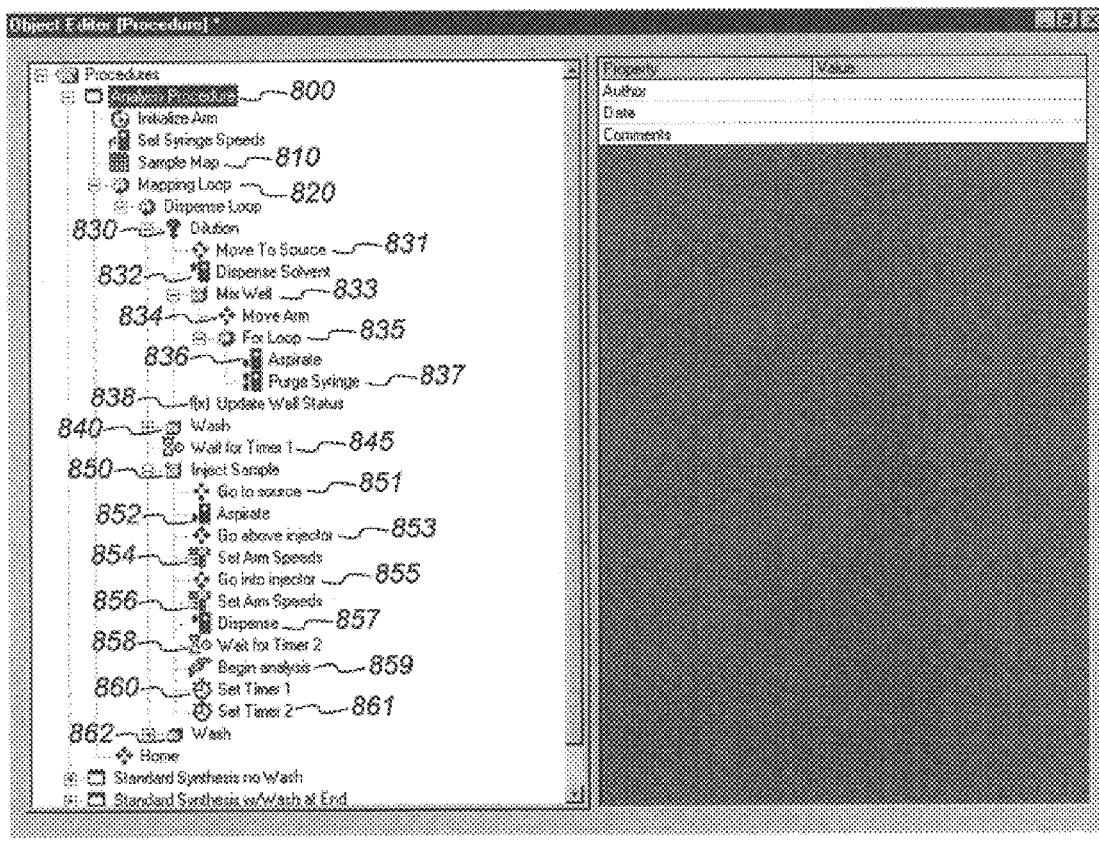
FIG. 8 is a window illustrating a material-handling procedure for characterizing a library of materials.

Depending on the resources, system devices and substrates defined for system 100, the user can create procedures to carry out processes other than library synthesis, such as, for example, screening or characterizing members of a combinatorial library. One such procedure is illustrated in FIG. 8. To implement such processes, system 100 need not obtain library design information from a recipe file. Instead, to define a screening process the user creates a procedure 800 as described above but incorporating "Sample Map" object 810 in place of the "Load Recipe" object discussed above. When executed by control module 140, "Sample Map" object 810 creates one or more mappings to define the library members to be sampled for screening. Control module 140 prompts the user to identify one or more source components for sampling, for example by specifying the identity and location of a multi-well plate defined for system 100. The user specifies a number of samples to be drawn from each well in the designated substrate, for example by entering integer values into a spreadsheet representing a source substrate array. The value of the integer entered into the spreadsheet determines the number of dispenses for the corresponding well. The user defines a destination substrate and position for the mapping, for example an injection port of an analytical device such as a liquid, gas or gel permeation chromatograph.

The user completes procedure 800 as described above, for example by defining a "Mapping Loop" object 820, which causes module 140 to iterate through the mappings defined by "Sample Map" object 810. For each dispense in each mapping, procedure 800 causes module 140 to instruct apparatus 180 to dilute and mix the contents of the specified well (If object 830 and child objects 831–838), wash the syringe tip ("Wash" object 840) and wait for a specified interval ("Wait for Timer 1" object 845).

"Inject Sample" object 850 contains a series of child objects 851–861 that define the injection process. "Go to source" object 851 causes apparatus 180 140 to move the syringe to the specified source location (e.g., a specified well in a substrate array). "Aspirate" object 852 causes apparatus 180 to draw a sample from the source location. "Go above injector" object 853 causes apparatus 180 to move the syringe to a location above an injection port of the analytical device. "Go into injector" object 855 causes apparatus 180 to move the syringe into the injection port at a speed set by "Set Arm Speeds" object 854 (which is then reset by object 856). "Dispense" object 857 causes module 140 to instruct apparatus 180 to inject the sample into the injection port. After waiting for a preset interval (as specified by "Wait for Timer 2" object 858), "Begin analysis" object 859 causes control module 140 to send a command to the analytical device to begin the analysis. Set Timer objects 860 and 861 then reinitialize Timers 1 and 2 for the next sample. After washing the syringe tip ("Wash" object 862), procedure 800 proceeds to the next well (i.e., the next dispense). Control module 140 repeats the procedure until a sample has been drawn from each specified source location and injected into the analytical device.

Control module 140 can execute multiple procedures simultaneously. For example, using an automated synthesis robot with two arms, control module 140 can execute a different procedure with each robot arm. However, errors can occur if the procedures attempt to control the same hardware—such as the same arm or syringe. Likewise, any attempt to run simultaneous procedures requiring access to common areas of the work surface can lead to errors unless timer objects are included to synchronize arm movements to avoid collisions.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Data can also be temporarily stored in volatile memory. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results. While the invention has been described in the context of a liquid handling system and procedure, the invention is equally applicable to other synthesis systems and techniques, such as vapor deposition systems as discussed above. Likewise, while the invention has been described in the context of specific hardware resources, system devices, substrates and code objects, additional data objects can be defined for other types of hardware resources, devices, substrates and process steps.

What is claimed is:

1. A computer program on a computer-readable medium for controlling a material-handling apparatus, the program comprising instructions operable to cause a programmable processor to:

provide an assortment of pre-programmed code objects, the assortment comprising a first pre-programmed code object operable to receive an input defining one or more source components, one or more destination components and one or more mappings, each source component representing one or more materials to be used in a process, each destination component representing one or more locations at which a process can be carried out, and each mapping relating a source component and a destination component and defining one or more transfers of at least one source component material to at least one destination component locations; and receive from a user a selection and arrangement of pre-programmed code objects from the assortment, the selection defining a set of material processing steps and the arrangement defining an order of execution for the selected pre-programmed code objects.

2. The computer program of claim 1, wherein the first pre-programmed code object is operable to interact with a user to receive a mapping.

3. The computer program of claim 2, wherein the first pre-programmed code object is operable to interact with a user to associate the source component with one or more source locations and the destination component with a destination location comprising an access port of an analytical device.

4. The computer program of claim 1, wherein the input is a recipe file including library design information defining the source component, the destination component and the mapping, and wherein the material processing steps define a procedure for synthesizing a combinatorial library of materials.

5. The computer program of claim 4, wherein the mapping defines a gradient for distributing the source component materials among the destination locations.

6. The computer program of claim 4, wherein the first pre-programmed code object is operable to interact with a user to associate the source component with one or more source locations, each source location having a source component material, and the destination component with a plurality of destination locations corresponding to a plurality of members of the combinatorial library.

7. The computer program of claim 1, wherein the assortment includes at least one second pre-programmed code object operable to label a mapping for processing by at least one third pre-programmed code object to be executed subsequently in the arrangement.

8. The computer program of claim 1, wherein the arrangement comprises a logical hierarchy including a parent pre-programmed code object and at least one child pre-programmed code object.

9. The computer program of claim 8, wherein the parent pre-programmed code object is operable to define a condition determining whether the at least one child pre-programmed code object will be executed subsequently in the arrangement.

10. The computer program of claim 9, wherein the parent pre-programmed code object is operable to provide that the at least one child pre-programmed code object will be executed at least one time for each mapping defined by the input.

11. The computer program of claim 9, wherein the parent pre-programmed code object is operable to provide that the at least one child pre-programmed code object will be executed at least one time for each transfer defined by one of the one or more mappings.

12. The computer program of claim 9, wherein the condition is a "for" condition.

13. The computer program of claim 9, wherein the condition is a "while" condition.

14. The computer program of claim 9, wherein the condition is an "if" condition.

15. For use in a system including an automated material-handling apparatus for carrying out a set of material processing steps, a computer program on a computer-readable medium for controlling the automated material-handling apparatus, the program comprising instructions operable to cause a programmable processor to:
receive a recipe file comprising component information and mapping information, the mapping information relating a source component representing one or more materials to be used in a process and a destination component representing one or more locations at which a process can be carried out, and defining one or more transfers of at least one source component material to at least one destination component location;
interact with a user to create a procedure for executing the set of material processing steps, including instructions to provide to the user an assortment of pre-programmed code objects and receive from the user a selection and arrangement of the pre-programmed code objects, the procedure being defined by the user's selection and arrangement; and
cause the automated material-handling apparatus to carry out the set of material processing steps by executing the procedure, wherein the procedure contains at least one first pre-programmed code object operable to read and interpret the recipe file and at least one second pre-programmed code object operable to interpret a mapping read from the recipe file.

16. The computer program of claim 15, further comprising instructions operable to cause a programmable processor to:
interact with a user to create a resource hierarchy including one or more resource objects defining at least one hardware device of the automated material-handling apparatus coupled to the programmable processor.

17. The computer program of claim 16, further comprising instructions operable to cause a programmable processor to:
interact with a user to create a system hierarchy including one or more system objects defining one or more robot arms coupled to the at least one hardware device of the automated material-handling apparatus.

18. The computer program of claim 16, further comprising instructions operable to cause a programmable processor to:
interact with a user to create a substrate hierarchy including one or more substrate objects defining a geometry for at least one substrate.

19. The computer program of claim 18, further comprising instructions operable to cause a programmable processor to:
interact with a user to create a one or more position objects for each substrate object in the substrate hierarchy.

20. The computer program of claim 18, wherein at least one substrate object corresponds to one or more source locations.

21. The computer program of claim 18, wherein at least one substrate object corresponds to one or more destination locations.

22. The computer program of claim 15, wherein:
execution of the procedure translates the component information and the mapping information to machine level commands for controlling the automated material-handling apparatus.

23. The computer program of claim 15, further comprising instructions operable to enable the user to modify the procedure during execution.

24. A computer-implemented method for controlling a material-handling apparatus, the method comprising:
providing an assortment of pre-programmed code objects, the assortment comprising a first pre-programmed code object operable to receive an input defining one or more source components, one or more destination components and one or more mappings, each source component representing one or more materials to be used in a process, each destination component representing one or more locations at which a process can be carried out, and each mapping relating a source component and a destination component and defining one or more transfers of at least one source component material to at least one destination component locations; and
receiving from a user a selection and arrangement of pre-programmed code objects from the assortment, the selection defining a set of material processing steps and the arrangement defining an order of execution for the selected pre-programmed code objects.

25. The method of claim 24, wherein the first pre-programmed code object is operable to interact with a user to receive a mapping.

26. The method of claim 25, wherein the first pre-programmed code object is operable to interact with a user to associate the source component with one or more source locations and the destination component with a destination location comprising an access port of an analytical device.

27. The method of claim 24, wherein the input is a recipe file including library design information defining the source component, the destination component and the mapping, and wherein the material processing steps define a procedure for synthesizing a combinatorial library of materials.

28. The method of claim 27, wherein the mapping defines a gradient for distributing the source component materials among the destination locations.

29. The method of claim 27, wherein the first pre-programmed code object is operable to interact with a user to associate the source component with one or more source locations, each source location having a source component material, and the destination component with a plurality of destination locations corresponding to a plurality of members of the combinatorial library.

30. The method of claim 24, wherein the assortment includes at least one second pre-programmed code object operable to label a mapping for processing by at least one third pre-programmed code object to be executed subsequently in the arrangement.

31. The method of claim 24, wherein the arrangement comprises a logical hierarchy including a parent pre-programmed code object and at least one child pre-programmed code object.

32. The method of claim 31, wherein the parent pre-programmed code object is operable to define a condition determining whether the at least one child pre-programmed code object will be executed subsequently in the arrangement.

33. The method of claim 32, wherein the parent pre-programmed code object is operable to provide that the at least one child pre-programmed code object will be executed at least one time for each mapping defined by the input.

34. The method of claim 32, wherein the parent pre-programmed code object is operable to provide that the at least one child pre-programmed code object will be executed at least one time for each transfer defined by one of the one or more mappings.

35. The method of claim 32, wherein the condition is a "for" condition.

36. The method of claim 32, wherein the condition is a "while" condition.

37. The method of claim 32, wherein the condition is an "if" condition.

38. A method of controlling an automated material-handling apparatus for executing a set of material processing steps, the method comprising:

receiving a recipe file comprising component information and mapping information, the mapping information relating a source component representing one or more materials to be used in a process and a destination component representing one or more locations at which a process can be carried out, and defining one or more transfers of at least one source component material to at least one destination component location;

interacting with a user to create a procedure for executing the set of material processing steps, the interacting comprising providing to the user an assortment of pre-programmed code objects and receiving from the user a selection and arrangement of the pre-programmed code objects, the procedure being defined by the user's selection and arrangement; and causing the automated material-handling apparatus to carry out the set of material processing steps by executing the procedure, wherein the procedure contains at least one first pre-programmed code object operable to read and interpret the recipe file and at least one second pre-programmed code object operable to interpret a mapping read from the recipe file.

39. The method of claim 38, further comprising:

interacting with a user to create a resource hierarchy including one or more resource objects defining at least one hardware device of the automated material-handling apparatus coupled to the programmable processor.

40. The method of claim 39, further comprising:

interacting with a user to create a system hierarchy including one or more system objects defining one or more robot arms coupled to the at least one hardware device of the automated material-handling apparatus.

41. The method of claim 39, further comprising:

interacting with a user to create a substrate hierarchy including one or more substrate objects defining a geometry for at least one substrate.

42. The method of claim 41, further comprising:

interacting with a user to create a one or more position objects for each substrate object in the substrate hierarchy.

43. The method of claim 41, wherein at least one substrate object corresponds to one or more source locations.

44. The method of claim 41, wherein at least one substrate object corresponds to one or more destination locations.

45. The method of claim 38, wherein:

execution of the procedure translates the component information and the mapping information to machine level commands for controlling the automated material-handling apparatus.

46. The method of claim 38, further comprising modifying the procedure during execution.

47. A system for executing a set of material processing steps, comprising:

means for receiving a recipe file comprising component information and mapping information, the mapping information relating a source component representing one or more materials to be used in a process and a destination component representing one or more materials to be used in a process, and defining one or more transfers of at least one source component material to at least one destination component location;

means for interacting with a user to create a procedure for executing the set of material processing steps, the means for interacting comprising means for providing to the user an assortment of pre-programmed code objects and means for receiving from the user a selection and arrangement of the pre-programmed code objects, the procedure being defined by the user's selection and arrangement; and means for carrying out the set of material processing steps by executing the procedure, wherein the procedure contains at least one first pre-programmed code object operable to read and interpret the recipe file and at least one second pre-programmed code object operable to interpret a mapping read from the recipe file.

* * * * *